Figure 1:
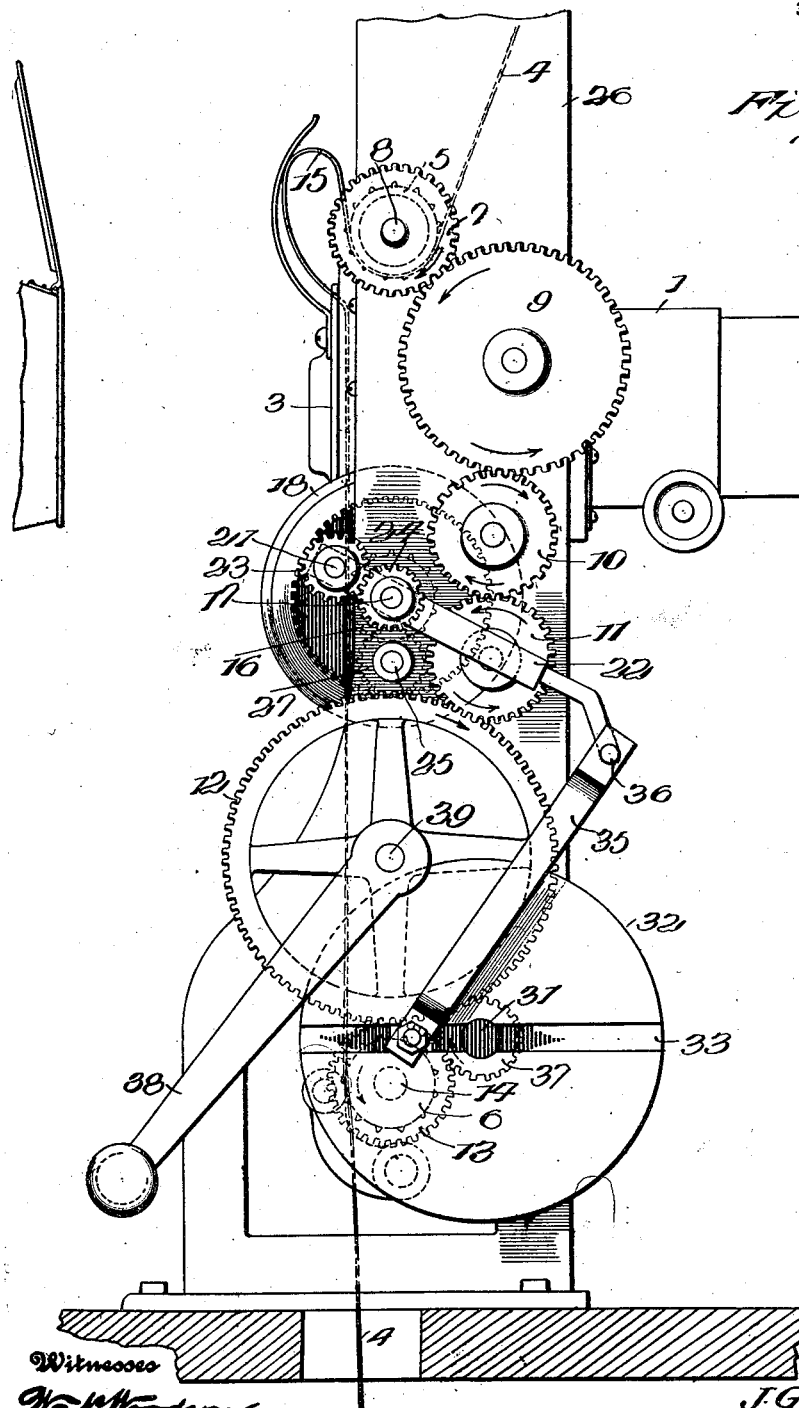

J. G. CLEMENS.
INTERMITTENT MOVEMENT FOR MOTION PICTURE MACHINES.
APPLICATION FILED FEB. 15, 1915.

1,162,037.

Patented Nov. 30, 1915.
3 SHEETS—SHEET 1.

Witnesses
W. N. Woodson
U. B. Hillyard.

Inventor
J. G. Clemens
By
Hansen, Attorneys.

J. G. CLEMENS.
INTERMITTENT MOVEMENT FOR MOTION PICTURE MACHINES.
APPLICATION FILED FEB. 15, 1915.
1,162,037.
Patented Nov. 30, 1915.
3 SHEETS—SHEET 2.
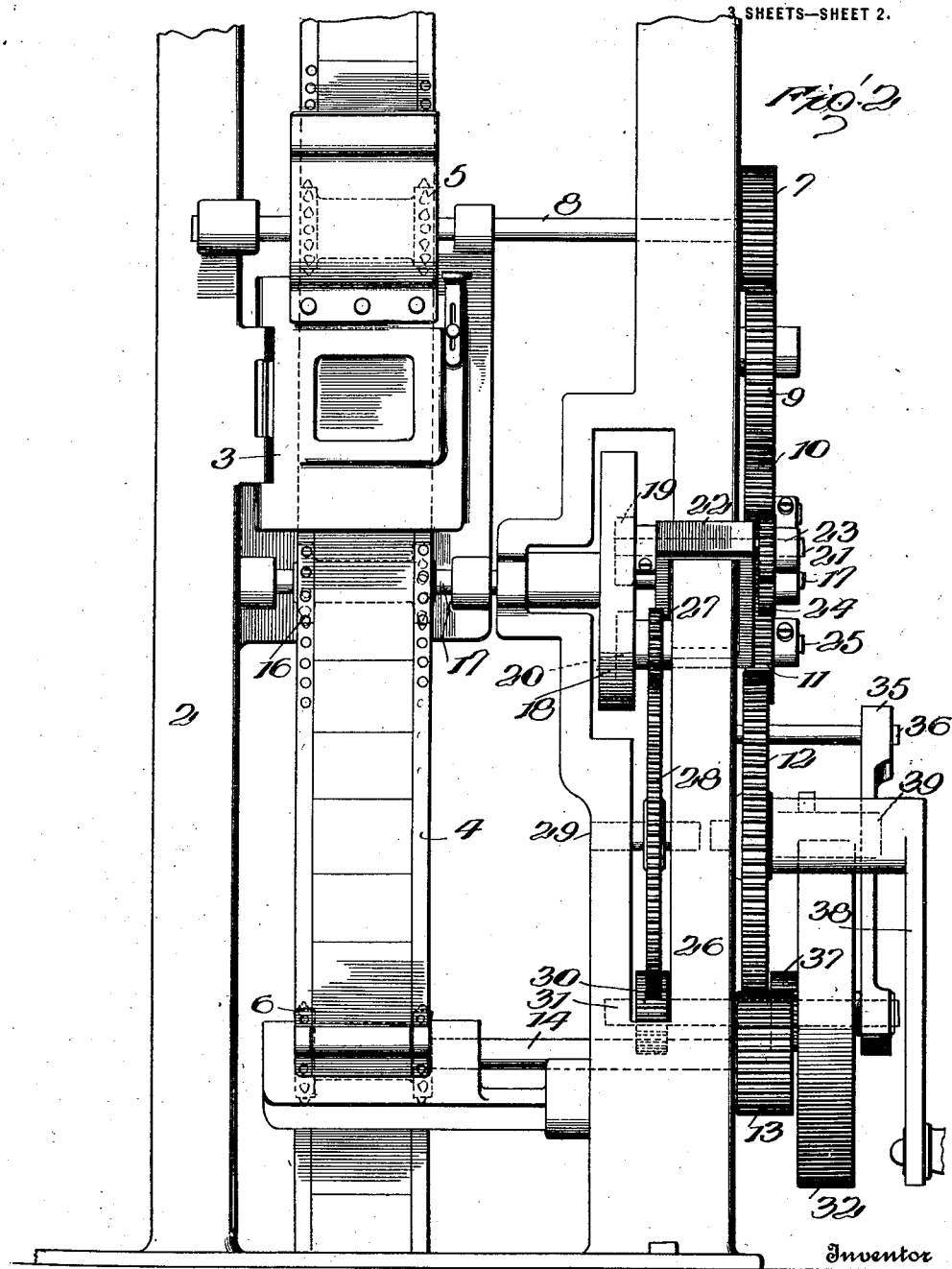
Witnesses
Inventor
J. G. Clemens J. G. CLEMENS.
INTERMITTENT MOVEMENT FOR MOTION PICTURE MACHINES.
APPLICATION FILED FEB. 15, 1915.
1,162,037.
Patented Nov. 30, 1915.
3 SHEETS—SHEET 3.
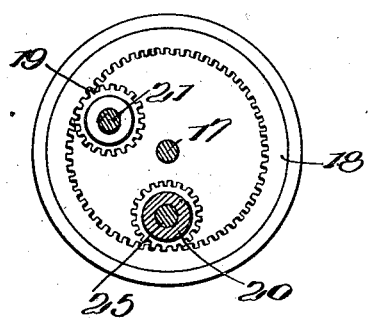
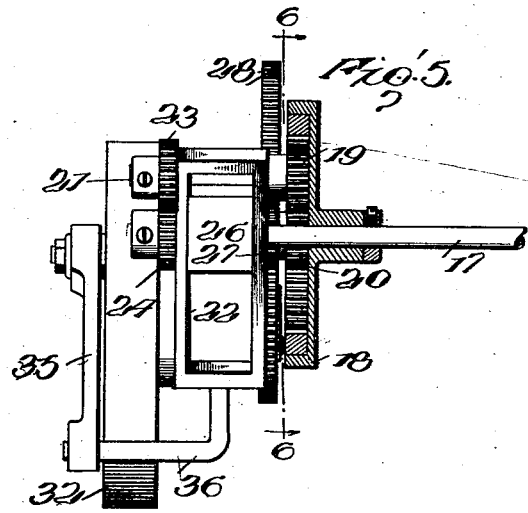
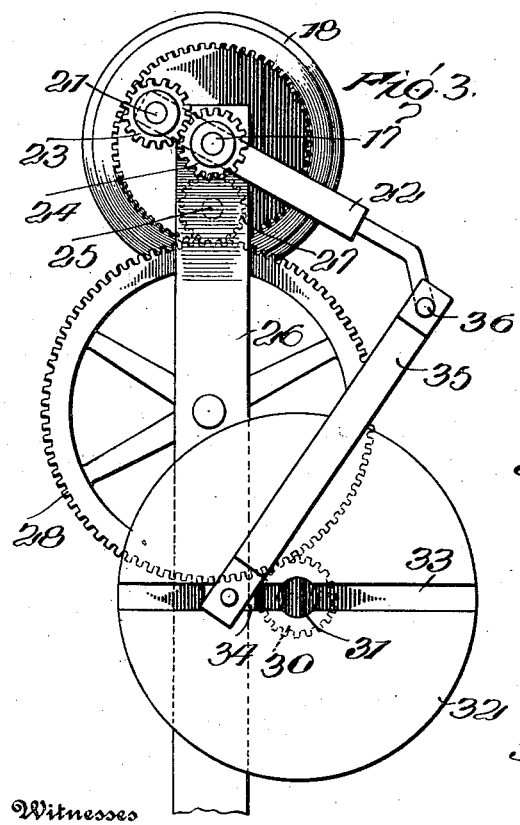
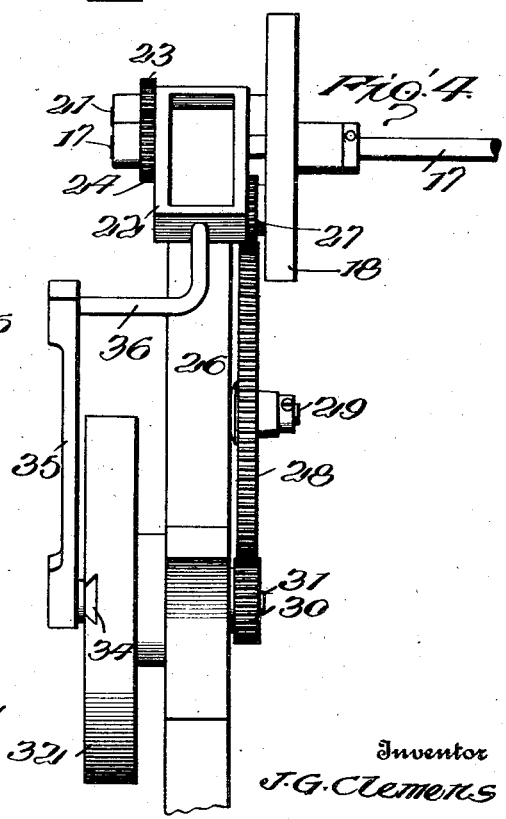
Witnesses
H. R. Woodson
V. B. Hillyard.
Inventor
J. G. Clemens
By
[signature], Attorneys.

UNITED STATES PATENT OFFICE.

JOHN G. CLEMENS, OF BUFFALO, NEW YORK.

INTERMITTENT MOVEMENT FOR MOTION-PICTURE MACHINES.

1,162,037. Specification of Letters Patent. Patented Nov. 30, 1915.

Application filed February 15, 1915. Serial No. 8,314.

*To all whom it may concern:*

Be it known that I, JOHN G. CLEMENS, a citizen of the United States, residing at Buffalo, in the county of Erie and State of New York, have invented certain new and useful Improvements in Intermittent Movement for Motion-Picture Machines, of which the following is a specification.

Kinetographic apparatus necessarily includes an intermittent movement of some nature and, in the type of machines utilizing a film or strip bearing the pictures or other matter to be exhibited upon a screen, such film is intermittently fed to bring the pictures successively into position to be projected upon the screen. Each picture must be accurately focused and at rest during the period of projection. This is generally attained by means of a mechanism known as the Geneva movement which, while effective for the purpose, is nevertheless open to the objection of being noisy in operation and short lived.

This invention provides a movement which is intermittent in operation, effective for the purpose of advancing kinetographic films and which is silent in operation and not subjected to such wear as to necessitate frequent replacement.

The invention has for its object to impart a variable and an intermittent movement to a rotatable film actuating member during the same period that a companion member makes a complete revolution.

The invention further consists of a peculiar gearing comprising members which travel in the same direction for a part of their movement and in opposite directions for the remainder of their travel and other members having a rotary movement imparted thereto, said movement being controlled by the reverse movements of the first-mentioned members to produce an intermittent and a variable rotary movement.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a side view of a film advancing movement for kinetographic apparatus embodying the invention; Fig. 2 is a front view of the parts illustrated in Fig. 1; Fig. 3 is a detail view of the movement disassociated from the kinetographic machine; Fig. 4 is a front view of the parts shown in Fig. 3; Fig. 5 is a top plan view of the movement illustrated in Figs. 3 and 4, the internal gear being in section; Fig. 6 is a section on the line 6—6 of Fig. 5 looking to the right, as indicated by the arrows.

Corresponding and like parts are referred to in the following description and indicated in all the views of the drawings by the same reference characters.

The movement is designed for kinetographic apparatus of any make or variety intended for projecting pictures or other matter to be displayed upon a screen. A portion of such apparatus is illustrated and comprises a lens 1, frame 2 and film guide 3. The film or strip bearing the pictures or matter to be displayed is indicated at 4 and is provided along its edges with the usual openings for coöperating with toothed spools by means of which the movement of the film is controlled. The upper spool is indicated at 5 and the lower spool at 6. A spur gear 7 is secured to the shaft 8 of the spool 5 and a train of gearing connects the spur gear 7 with a drive gear, the train of gearing comprising the spur gears 9, 10 and 11, the latter being in mesh with the drive gear 12. A spur gear 13 secured to the shaft 14 of the spool 6 is in mesh with the drive gear 12. The train of gearing is such as to drive the spools 5 and 6 uniformly and in opposite directions. The spool 5 draws the film from the upper reel, not shown, the upper loop 15 being formed between the spool 5 and the guide 3. The lower loop, not shown, is formed between the spool 6 and the lower reel.

The spool for intermittently advancing the film or strip 4, is indicated at 16 and is secured to a shaft 17. An internally toothed gear 18 is loose upon the shaft 17 and its teeth are in mesh with spur gears 19 and 20. The gear wheel 19 is secured to one end of a shaft 21 which is mounted in one end of a lever 22, the opposite end of such shaft having a gear wheel 23 attached thereto, said gear wheel meshing with a gear wheel 24 which is secured to the shaft 17 so as to rotate therewith. The gear wheel 20 is mounted upon a stub shaft 25 projecting laterally from a post 26 to which the lever 22 is fulcrumed. A gear wheel 27 is connected with the gear wheel 20 so as to rotate therewith and meshes with a gear wheel 28 mounted upon a shaft 29 which is supported in the post 26. The gear wheel 28 is in mesh with a gear wheel 30 which is secured to one end of a shaft 31, said shaft being provided on its opposite end with a wheel 32 in the outer face of which is formed a diametrical slot 33 in which is fitted a slide 34. A pitman 35 connects a wrist pin of the slide 34 with a laterally bent end 36 of the lever 22. A gear wheel 37 secured to the shaft 31 is in mesh with the gear wheel 13 and derives motion therefrom. The initial movement is applied to the drive gear 12 in any manner preferably by means of a crank 38 which is secured to one end of the shaft 39 upon which the drive gear 12 is secured.

Rotation of the drive gear 12 rotates the spool 6 by the intermeshing of the teeth of the drive gear 12 with the teeth of the spur gear 13. The spool 5 is rotated by means of the intermittent train of gearing between the drive gear 12 and the spur gear 7 which is secured to the shaft 8. The internally toothed gear wheel 18 as also the gears 20, 27, 28, 30 and 37 are continuously driven by reason of the meshing of the spur gears 13 and 37. The lever 22 is oscillated by reason of its pitman connection with the wheel 32. The shaft 21 mounted upon the lever 22 is reciprocated and carries the gears 19 and 23 backward and forward in an arcuate path having the shaft 17 as its center, hence the teeth of the spur gear 19 are at all times in mesh with the teeth of the gear wheel 18 and the teeth of the gear wheel 23 are always in meshing relation with the teeth of the gear wheel 24. The gears 19, 23, 24, 20 and 27 are of uniform diameter, hence each makes a complete revolution in the same interval of time but by reason of the mounting of the gear wheel 23 so as to move about the gear wheel 24 in a forward and backward travel the gear wheel 24 is driven intermittently and at a variable speed but in such a manner as to make a complete revolution in the same time as the companion gear 23. It must be remembered that the gear wheel 24 is secured to the shaft 17 and the latter in turn has the film advancing spool 16 secured thereto it follows therefore that the film 4 is advanced intermittently, the pictures being projected upon the screen at the periods of rest. In order to compensate for the interval of rest of the gear wheel 24, the same moves faster than the gear wheel 23 so that each may complete its revolution in the same time. During the rapid forward movement of the gear wheel 24 the film is moved to bring the next picture in position to be focused and projected. It is assumed that the movement operates in a manner to rotate the film advancing spool 16 in an anti-clockwise direction. As a result the companion gear 23 is rotated in a clockwise direction as is also the internally toothed gear 18. When the lever 22 is moved to cause the gear wheel 23 to travel upward or around the gear wheel 24, the latter remains stationary and during the return travel of the gear wheel 23 resulting from a reverse oscillation of the lever 22 the gear wheel 24 is moved at a higher rate of speed than the gear wheel 23, thereby making up for the interval of rest so that the two gear wheels 23 and 24 make a complete revolution at the same time. This result requires a proper disposition of the coöperating elements. The movement while positive is free from sudden stops and starts which are the chief source of noise and wear in the movement as generally provided for kinetographic apparatus.

It will be understood from the foregoing taken in connection with the accompanying drawings that the movement contemplates essentially two members, the one having a combined rotary and reciprocating movement imparted thereto and the other being rotated in the same direction by an intermittent and variable movement, the latter member being connected with the spool or like element by means of which the film or picture strip is intermittently advanced.

Having thus described the invention, what is claimed as new is:—

1. In a movement of the character specified, an actuating member, a shaft having the actuating member secured thereto, an oscillating member mounted upon the shaft, a second shaft mounted upon the oscillating member, a gear wheel secured to the second shaft and in mesh with the actuating member, a drive gear loose upon the first-mentioned shaft and a gear wheel secured to the second shaft and in mesh with the drive gear.

2. In a movement of the character set forth, the combination of a primary shaft, a gear wheel secured to the primary shaft, an oscillating member mounted upon the primary shaft, a secondary shaft mounted upon the oscillating member, a gear wheel secured to the secondary shaft and in mesh with the gear wheel of the primary shaft, an internally toothed gear wheel loose upon the primary shaft and a gear wheel secured to the secondary shaft and in mesh with the internally toothed gear wheel.

3. In combination, a primary shaft, a gear wheel secured to the primary shaft, an oscillating member mounted upon the primary shaft, a second shaft, a gear wheel secured to the second shaft and in mesh with the gear wheel of the primary shaft, an internally toothed gear wheel loose upon the primary shaft, a gear wheel secured to the second shaft and in mesh with the internally toothed gear wheel, a drive gear, connecting means between the drive gear and the internally toothed gear, a pulley geared to the said drive gear and a pitman connection between said pulley and the said oscillating member.

4. In apparatus of the class described, a film feed shaft to be intermittently rotated, an internal gear loosely mounted upon the said shaft, means for continuously rotating said internal gear, a member mounted for oscillatory movement upon the said shaft, means for oscillating the said member, a shaft journaled upon the oscillatory member parallel to the first mentioned shaft, a gear fixed upon the second mentioned shaft and meshing with the internal gear, a second gear fixed upon the second mentioned shaft, and a gear fixed upon the first mentioned shaft and meshing with the last mentioned gear upon the second mentioned shaft.

In testimony whereof I affix my signature in presence of two witnesses.

JOHN G. CLEMENS. [L. S.]

Witnesses:
 FRANK H. KAISER,
 JOSEPH HEESER.